(12) United States Patent
Abe

(10) Patent No.: US 6,945,562 B2
(45) Date of Patent: Sep. 20, 2005

(54) PASSENGER LEG PROTECTION APPARATUS

(75) Inventor: Kazuhiro Abe, Shiga (JP)

(73) Assignee: Takata Corporation, Tokyo (JP)

( * ) Notice: Subject to any disclaimer, the term of this patent is extended or adjusted under 35 U.S.C. 154(b) by 46 days.

(21) Appl. No.: 10/348,759

(22) Filed: Jan. 23, 2003

(65) Prior Publication Data

US 2003/0155759 A1 Aug. 21, 2003

(30) Foreign Application Priority Data

Feb. 18, 2002 (JP) ........................................ 2002-040432

(51) Int. Cl.$^7$ .............................................. B60R 21/16
(52) U.S. Cl. ................................. 280/743.1; 280/730.1
(58) Field of Search .................. 280/730.1, 743.1; 53/116, 117, 429

(56) References Cited

U.S. PATENT DOCUMENTS

| | | | | |
|---|---|---|---|---|
| 5,667,243 A | * | 9/1997 | Fisher et al. | 280/730.2 |
| 5,906,395 A | * | 5/1999 | Isaji et al. | 280/743.1 |
| 6,155,598 A | * | 12/2000 | Kutchey | 280/730.2 |
| 6,173,988 B1 | | 1/2001 | Igawa | |
| 6,176,509 B1 | | 1/2001 | Kawaguchi et al. | |
| 6,196,585 B1 | * | 3/2001 | Igawa | 280/743.1 |
| 6,279,944 B1 | * | 8/2001 | Wipasuramonton et al. | 280/730.2 |
| 6,286,866 B1 | | 9/2001 | Satge et al. | |
| 6,692,024 B2 | * | 2/2004 | Fischer et al. | 280/743.1 |
| 2003/0132617 A1 | | 7/2003 | Takimoto et al. | |

FOREIGN PATENT DOCUMENTS

| | | |
|---|---|---|
| EP | 0 957 007 A2 | 11/1999 |
| JP | 5-208648 | 8/1993 |
| JP | 10-338096 | 12/1998 |
| JP | 2001-39253 | 2/2001 |

\* cited by examiner

Primary Examiner—David R. Dunn
(74) Attorney, Agent, or Firm—Manabu Kanesaka

(57) ABSTRACT

A passenger leg protection apparatus includes an airbag to be inflated at a position in front of legs of a passenger for protecting the legs, a case accommodating the folded airbag, and a gas generating unit for inflating the airbag. The folded body of the airbag includes a wound body folded along lateral folding lines extending laterally relative to the passenger several times in the same folding direction. The airbag is disposed in the case so that the wound body is deployed upward or downward while rolling along a front surface of the legs so as to be unwound when being inflated.

5 Claims, 12 Drawing Sheets

Fig. 1(a) Fig. 1(b)
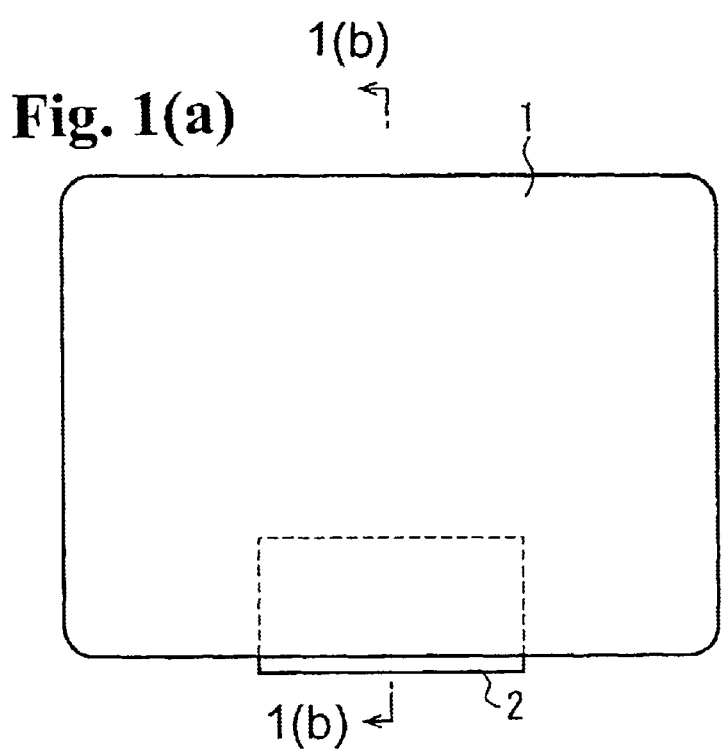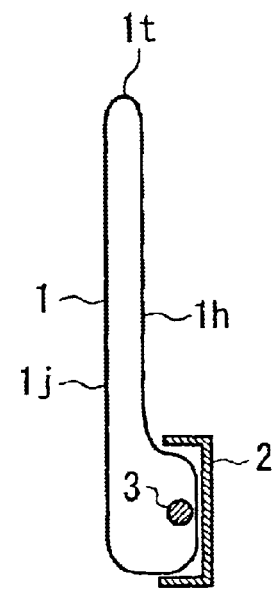
Fig. 2(a) Fig. 2(b)
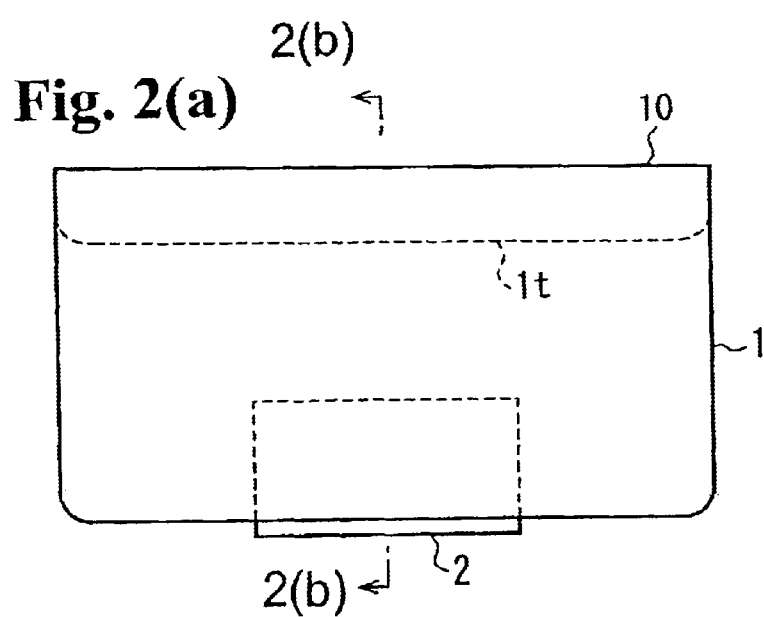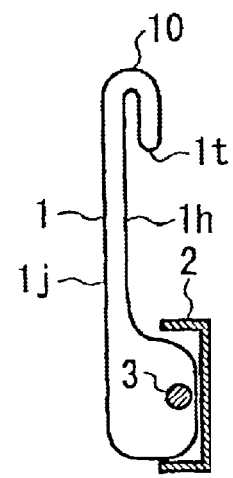

Fig. 3(a)
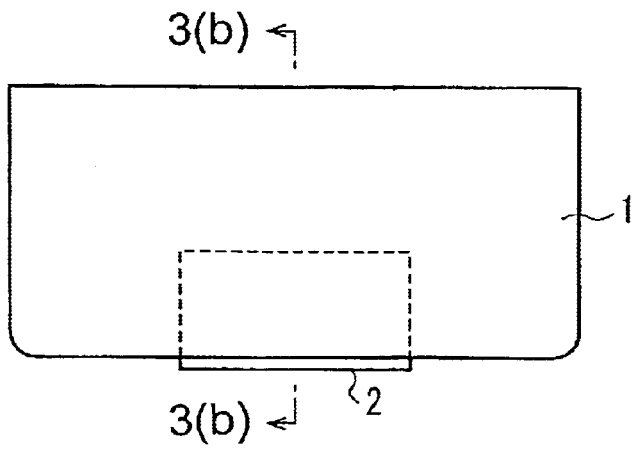
Fig. 3(b)
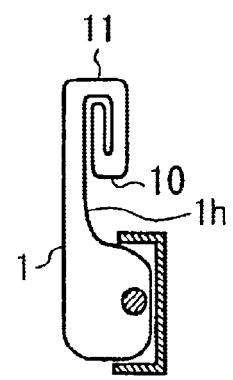
Fig. 4(a)
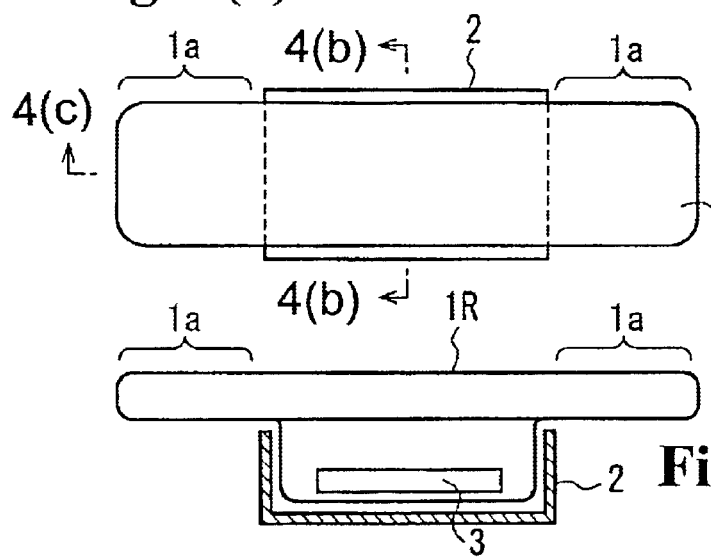
Fig. 4(b)
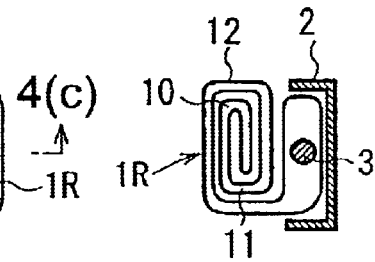
Fig. 4(c)
Fig. 5(a)
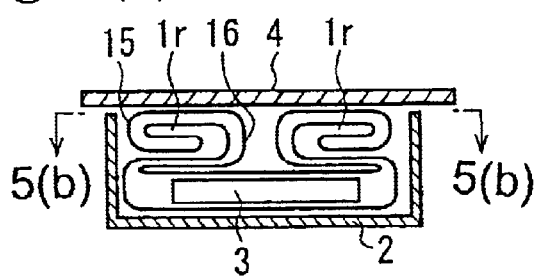
Fig. 5(b)
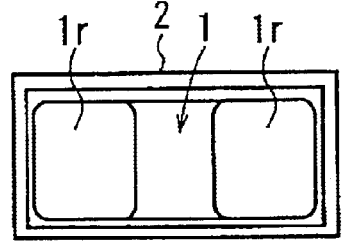

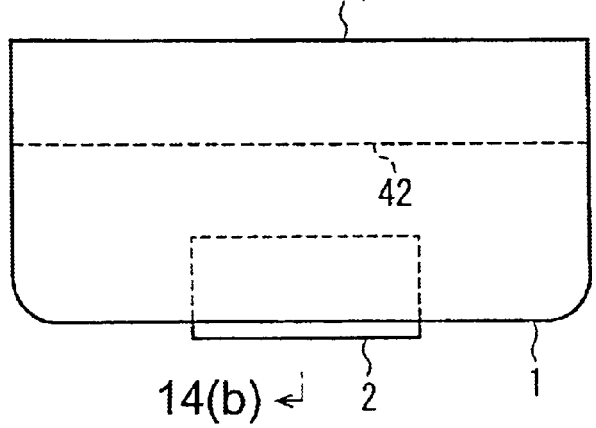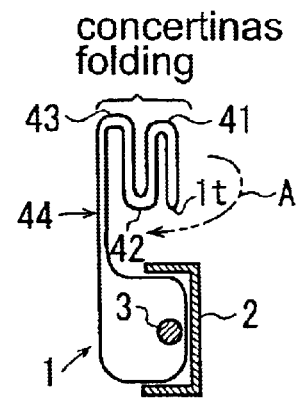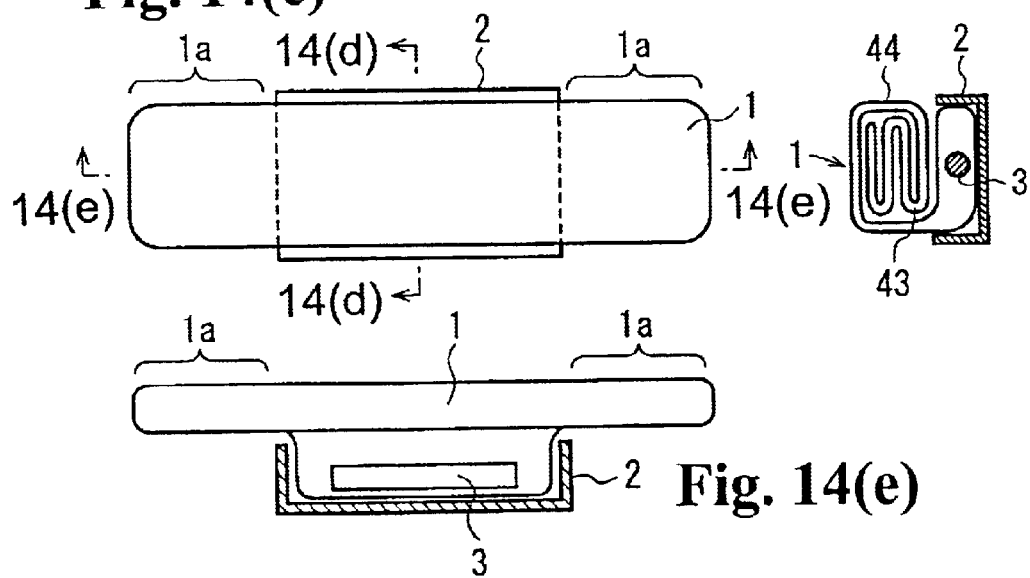

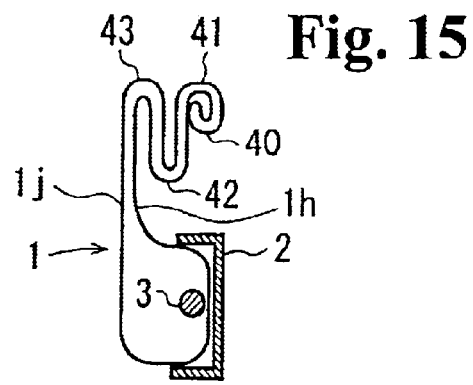
Fig. 15
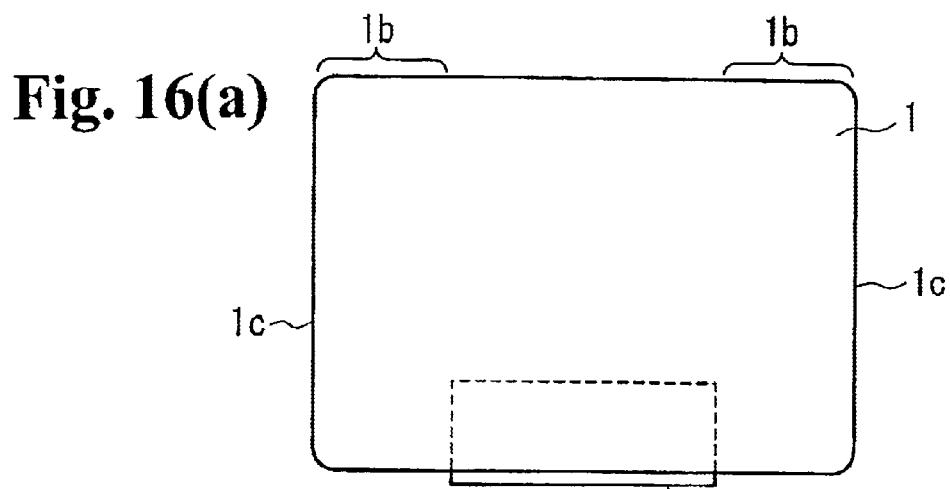
Fig. 16(a)
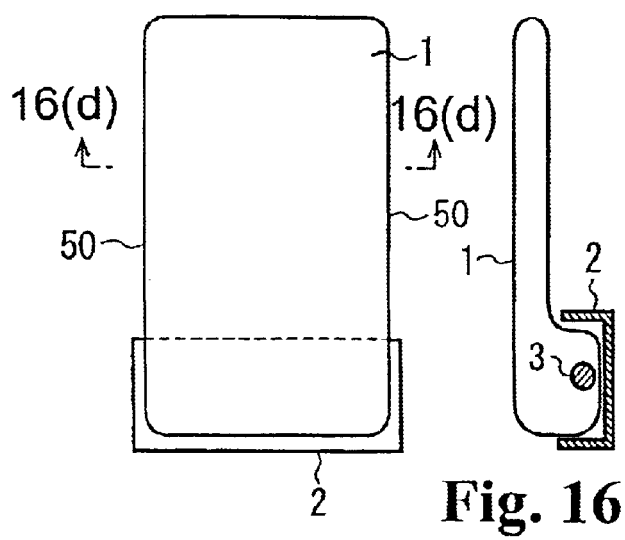
Fig. 16(b)
Fig. 16(c)
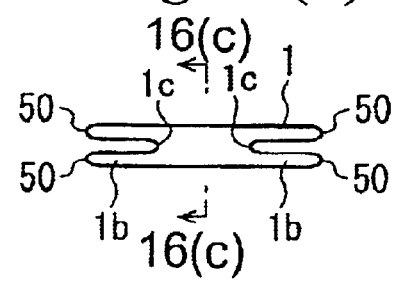
Fig. 16(d)

PASSENGER LEG PROTECTION APPARATUS

BACKGROUND OF THE INVENTION AND RELATED ART STATEMENT

The present invention relates to a passenger leg protection apparatus. More specifically, the present invention relates to an apparatus for protecting legs of a passenger in a high-speed moving body such as a vehicle by inflating an airbag, so-called knee-bag or knee-airbag, at a position in front of the legs in case of collision of the vehicle or the like.

As a passenger leg protection apparatus, it is well known that an airbag device is installed in an interior member of a vehicle in front of a seat at a level corresponding to lower legs of a passenger, and an airbag is inflated upon collision of the vehicle to receive the legs, especially, portions under knees, of the passenger. This type of passenger leg protection apparatus includes a folded airbag, a case for accommodating the airbag, a gas generator for inflating the airbag, and a lid member for covering a front face of the case or the like.

A method of folding the airbag of the passenger leg protection apparatus has not been widely disclosed. A method of folding an airbag for quickly expanding and deploying the airbag sideways is described in Japanese Patent Publication No. 05-208648. This publication relates to a passenger leg protection apparatus installed at positions shifted leftward or rightward from the front of the legs of the passenger.

It is an object of the present invention to provide a passenger leg protection apparatus to be disposed in front of the legs of the passenger in which the airbag is deployed smoothly upward or downward along the legs of the passenger.

Further objects and advantages of the invention will be apparent from the following description of the invention.

SUMMARY OF THE INVENTION

According to the present invention, a passenger leg protection apparatus includes an airbag to be inflated at a position in front of legs of a passenger for protecting the legs, a case accommodating the folded airbag, and a gas generating unit for inflating the airbag. The folded airbag includes a wound body folded several times in the same folding direction along lateral folding lines extending laterally relative to the passenger. The airbag is disposed in the case so that the wound body is deployed upward or downward while rolling along a front surface of the legs so as to be unwound when being inflated.

According to the passenger leg protection apparatus of the present invention, the gas generating unit is actuated in case of emergency such as collision of the vehicle or the like to inflate the airbag to receive the legs of the passenger.

The folded body of the airbag includes a wound body folded and wound along the lateral folding lines several times in the direction toward or away from the passenger. When the airbag is inflated, the wound body is deployed while rotating upward or downward along the front surface of the legs of the passenger. Therefore, the airbag can be inflated smoothly upward or downward without being blocked by the front surface of the legs of the passenger.

In the present invention, after the wound body is formed by folding the airbag along the lateral folding lines extending laterally relative to the passenger several times in the direction toward or away from the passenger, and then the airbag is folded along the vertical folding lines extending vertically of the passenger. In this case, after coming out of the case, the airbag is deployed in the lateral direction and placed in front of the left leg and the right leg of the passenger, and is subsequently inflated while rotating upward or downward. This mode is especially preferable when a relatively large space is available in front of the passenger.

In another embodiment of the present invention, the wound body of the airbag is folded along the vertical folding lines at first, and then folded along the lateral folding lines. In this case, after coming out of the case, the left and right folded portions of the airbag are deployed, and almost simultaneously, the wound body is inflated while rolling upward or downward. This mode is especially preferable when only a relatively small space is available in front of the legs of the passenger.

BRIEF DESCRIPTION OF THE DRAWINGS

FIGS. 1(a) and 1(b) are views showing a process of folding an airbag according to an embodiment;

FIGS. 2(a) and 2(b) are views showing a process of folding the airbag according to the embodiment;

FIGS. 3(a) and 3(b) are views showing a process of folding the airbag according to the embodiment;

FIGS. 4(a) to 4(c) are views showing a process of folding the airbag according to an embodiment;

FIGS. 5(a) and 5(b) are views showing a process of folding the airbag according to the embodiment;

FIGS. 14(a) to 14(d) are views showing a process of folding the airbag according to a still further embodiment;

FIG. 15 is a view showing a process of folding the airbag according to the still further embodiment;

FIGS. 16(a) to 16(d) are views showing a process of folding the airbag according to a still further embodiment;

DETAILED DESCRIPTION OF PREFERRED EMBODIMENTS

Hereunder, embodiments of the present invention will be described with reference to the drawings.

Figure 6A:
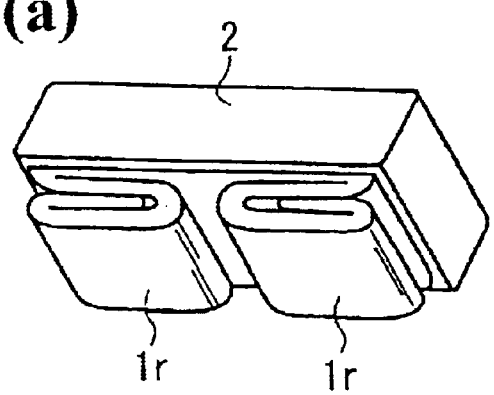
FIGS. 6(a) to 6(c) are views showing a state of inflation of the airbag according to the embodiment.
Figure 6B:
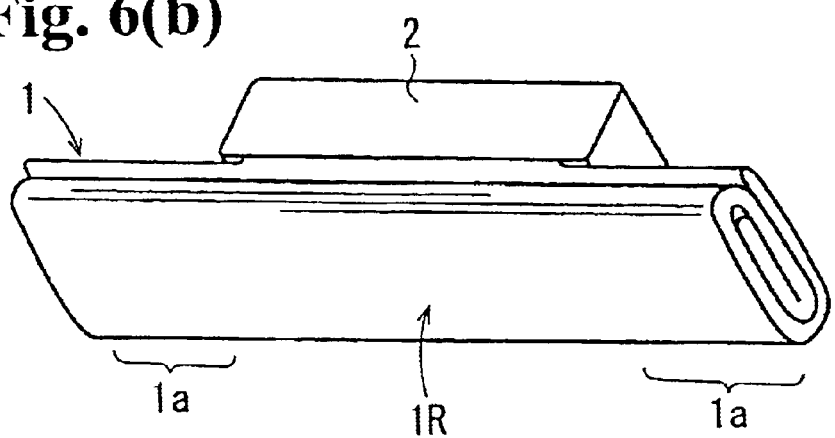
Figure 6C:
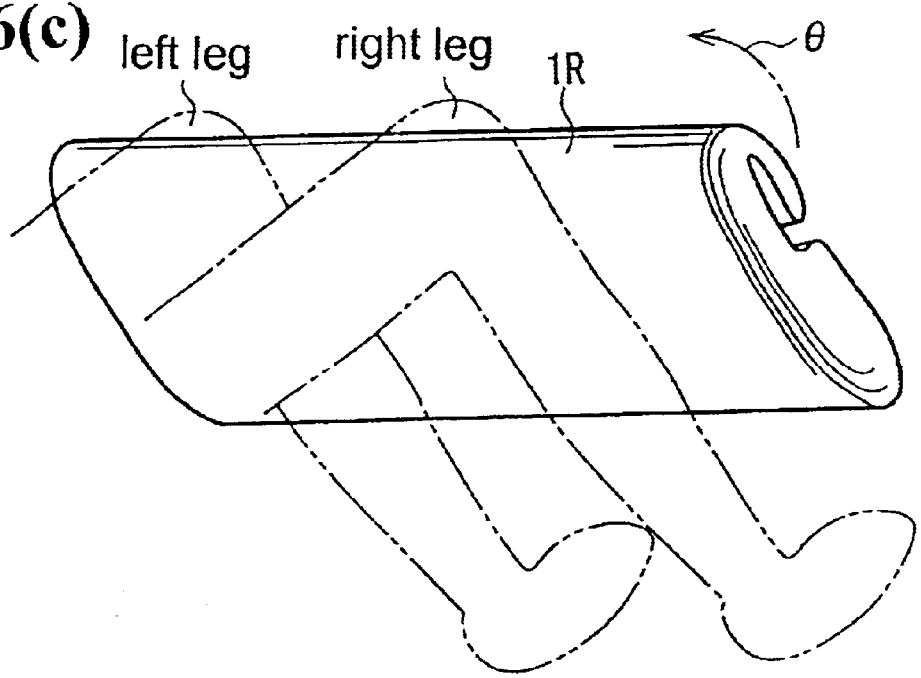

FIGS. 1(a), 1(b) to FIGS. 5(a), 5(b) are explanatory drawings showing a process of folding an airbag in the passenger leg protection apparatus according to the embodiments. FIGS. 1(b), 2(b), 3(b), 4(b) and 5(b) are cross sectional views taken along line 1(b)—1(b), 2(b)—2(b), 3(b)—3(b), 4(b)—4(b) and 5(b)—5(b) in FIGS. 1(a), 2(a), 3(a), 4(a) and 5(a), respectively. FIG. 4(c) is a cross sectional view taken along line 4(c)–4(c) in FIG. 4(a). FIGS. 6(a), 6(b) and 6(c) are explanatory drawings illustrating the steps of inflation of the airbag.

A passenger leg protection apparatus includes an airbag (knee-airbag) 1, a case 2 accommodating the folded airbag 1, an inflator 3 as a gas generator for inflating the airbag 1, and a lid 4 (shown in FIG. 5(a)) for covering a front opening of the case 2. The inflator 3 is disposed in the airbag 1. Stud bolts (not shown) project from the inflator 3 or a holder (not shown) for holding the inflator 3. The stud bolt passes through the airbag 1 and a rear surface of the case 2, and a nut (not shown) is tightened thereon. The inflator 3 is fixed to the case 2 by tightening the nuts, and a rear end of the airbag 1 is clamped between the inflator 3 or the holder thereof and the rear surface of the case 2.

A process of folding the airbag 1 is done as follows. Note that the airbag 1 is placed on a flat and horizontal working table together with the case 2, spread flatly, and then folded. The airbag 1 is shown in a state that the airbag is unfolded along a vertical plane in FIGS. 1(a), 1(b) to FIGS. 3(a), 3(b), in order to show a state that the passenger leg protection apparatus is installed in a vehicle. In FIGS. 1(a), 1(b) to FIGS. 3(a), 3(b), FIGS. 4(a), 4(b), FIG. 5(b) and FIGS. 6(a)—6(C), the vertical directions in the respective figures correspond substantially to the vertical direction of the passenger leg protecting apparatus installed in the vehicle.

The airbag 1 is pulled out from the case 2 as shown in FIG. 1(a), and spread flatly. In this embodiment, the airbag 1 is spread upwardly relative to the case 2. Subsequently, as shown in FIG. 2(a), the airbag 1 is folded by a predetermined width (for example, 20 to 150 mm) along a lateral folding line 10 at a position away from an upper edge 1t of the airbag from a passenger side 1j toward an opposite side 1h away from a passenger.

Then, as shown in FIG. 3(a), the airbag 1 is folded by the same width as in FIG. 2(a) along a lateral folding line 11 from the passenger side 1j toward the opposite side 1h away from the passenger. Then, as shown in FIG. 4(a), the airbag 1 is folded again by the same width along a lateral folding line 12 from the passenger side 1j to the opposite side 1h away from the passenger. The folding direction along the folding lines 10, 11 and 12 are identical, thereby forming a wound body (main wound body) 1R as shown in FIG. 4(b). The wound body 1R is wound clockwise toward the edge 1t as shown in a vertical cross section of the vehicle taken along a plane in the front-rear direction in a state that the passenger is on the left side in FIG. 4(b).

The wound body 1R has overhanging portions 1a overhanging leftward and rightward from the case 2, as shown in FIGS. 4(a) and 4(c). Accordingly, these overhanging portions 1a are folded along vertical folding lines 15, 16 (See FIG. 5(a)) toward the inside of the case 2 from the passenger side 1j toward the opposite side 1h away from the passenger, thereby forming wound bodies (side wound bodies) 1r, and then stored in the case 2. Subsequently, the lid 4 is attached to form the passenger leg protection apparatus.

The passenger leg protection apparatus is installed, for example, in the interior panel in front of the seat, and the lid 4 is arranged to be flush with the interior panel.

When the inflator 3 is actuated and the airbag 1 of the passenger leg protection apparatus is inflated upon collision of the vehicle, the lid 4 is opened by being pressed by the airbag 1, and the side wound bodies 1r of the airbag 1 project from the case 2 toward the front as shown in FIG. 6(a). Then, the side wound bodies 1r are deployed leftward and rightward relative to the legs of the passenger, as shown in FIG. 6(b), and then the main wound body 1R of the airbag 1 is deployed upward in front of the legs of the passenger. The main wound body 1R wound in the clockwise direction rotates in the counterclockwise direction θ as shown in FIG. 6(c), and is deployed upward. In this case, since the wound bodies 1r and 1R are unwound in such a way of rolling along the front surface of the legs, the front surfaces of the legs do not block the airbag 1 upon inflation. Therefore, the airbag 1 deploys quite smoothly.

With reference to FIGS. 7(a)–7(d) to FIGS. 10(a), 10(b), another folding process will be described. FIGS. 7(b), 8(b), 9(b) and 10(b) are cross sectional views taken along lines 7(b)—7(b), 8(b)—8(b), 9(b)—9(b) and 10(b)—10(b) in FIGS. 7(a), 8(a), 9(a) and 10(a), respectively.

Figure 7A:
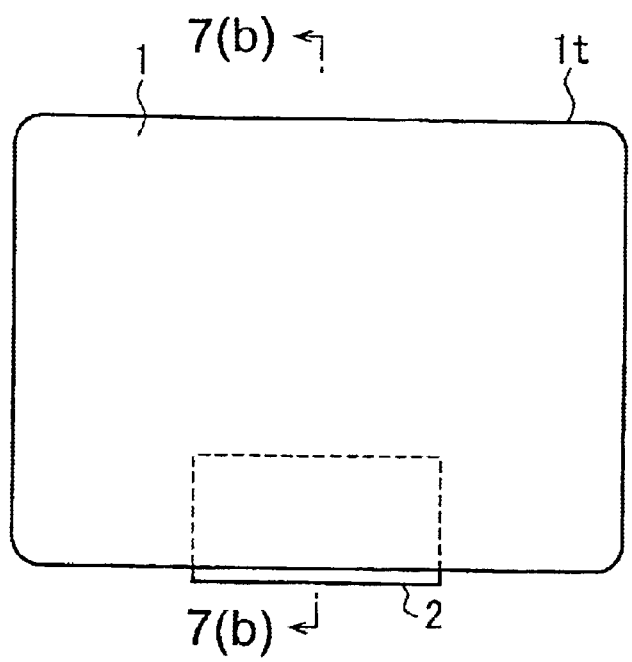
FIGS. 7(a) to 7(d) are views showing a process of folding the airbag according to another embodiment.
Figure 7B:
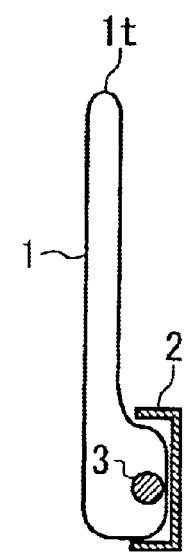

FIGS. 7(a) and 7(b) show a state in which the airbag is flatly spread before being folded as in FIGS. 1(a) and (b). The airbag 1 is spread above the case 2.

Figure 7C:
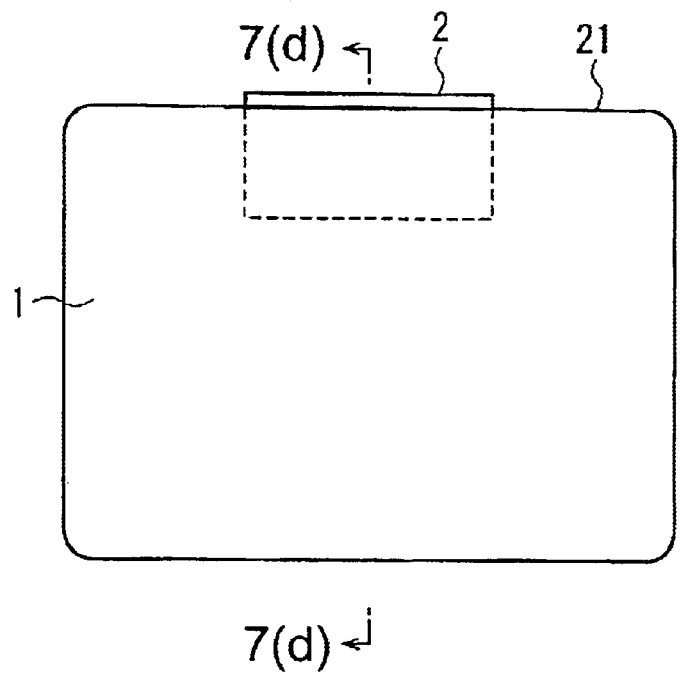
Figure 7D:
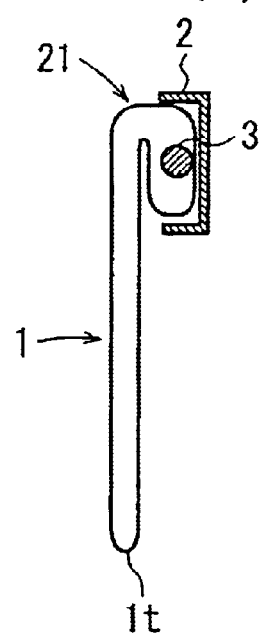
Figure 8A:
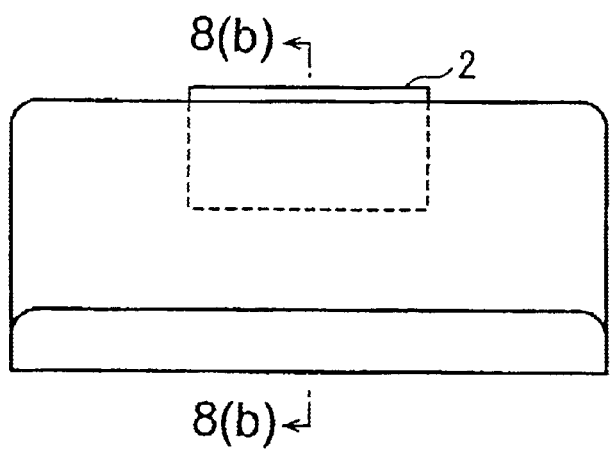
FIGS. 8(a) and 8(b) are views showing a process of folding the airbag according to another embodiment.
Figure 8B:
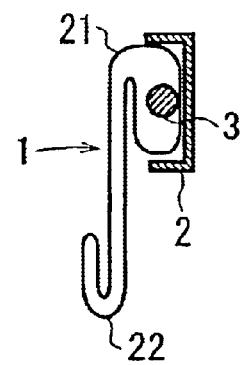
Figure 9A:
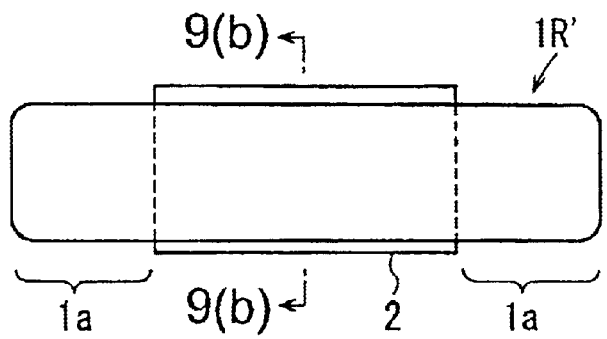
FIGS. 9(a) and 9(b) are views showing a process of folding the airbag according to another embodiment.
Figure 9B:
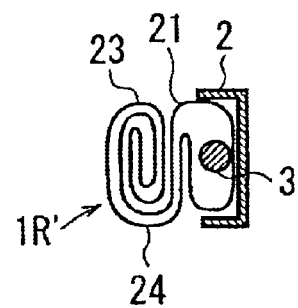

From this state, as shown in FIGS. 7(c) and 7(d) (FIG. 7(d) is a cross sectional view taken along line 7(d)—7(d) in FIG. 7(c)), the airbag 1 is folded as a whole downwardly relative to the case 2 along a lateral folding line 21. Then, as shown in FIGS. 8(a) and 8(b) and FIGS. 9(a) and 9(b), the airbag 1 is folded along lateral folding lines 22, 23, 24 in sequence to form a main wound body 1R'. The wound body 1R' is also wound clockwise toward the edge it as shown on a vertical cross section in FIG. 9(b).

Figure 10A:
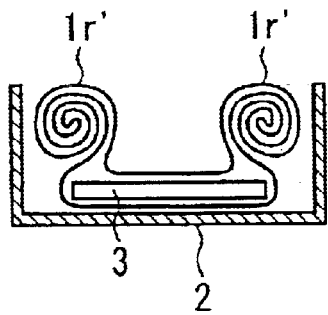
FIGS. 10(a) and 10(b) are views showing a process of folding the airbag according to another embodiment.
Figure 10B:
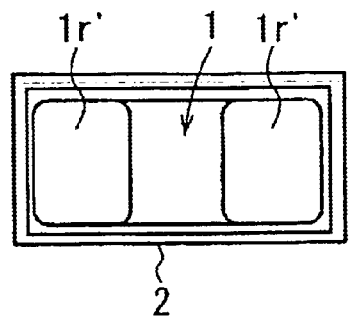

Next, the overhanging portions 1a overhanging at left and right sides of the case 2 are folded or wound in the same direction along the vertical folding lines, respectively, thereby forming side wound bodies 1r' as shown in FIGS. 10(a) and 10(b). Then, the wound bodies 1r' and 1R' are stored inside the case 2, and the lid 4 (not shown in FIG. 10(a)) is attached to complete the passenger leg protection apparatus.

The sequence of inflation of the airbag 1 of the passenger leg protection apparatus is the same as that shown in FIGS. 6(a)–6(c). That is, in this case, the airbag 1 comes out from the case 2 toward the front, is deployed leftward and rightward quickly as rolling without being blocked by the legs of the passenger, and is then deployed upward smoothly.

Figure 11A:
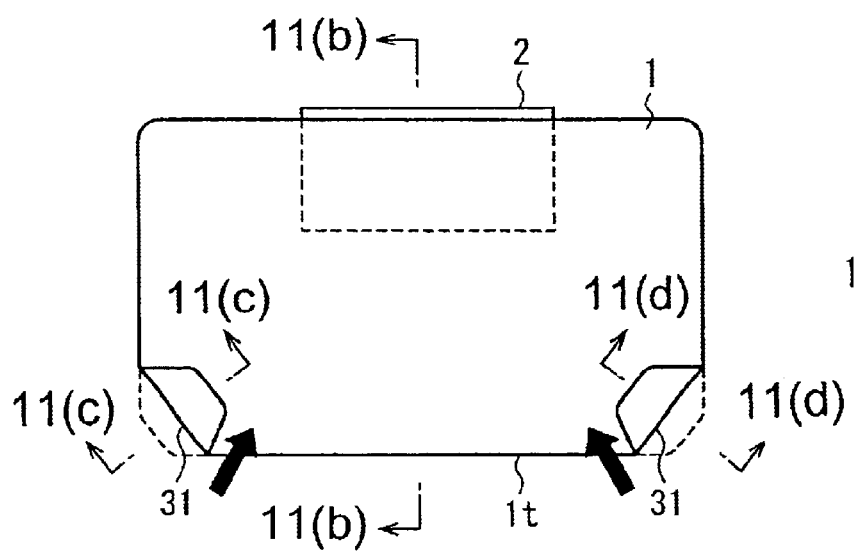
FIGS. 11(a) to 11(d) are views showing a process of folding the airbag according to a further embodiment.
Figure 11B:
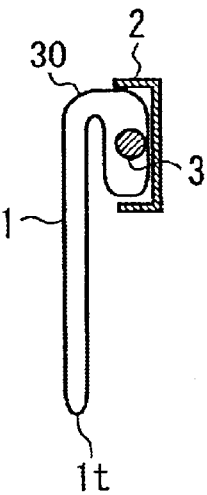
Figure 11C:
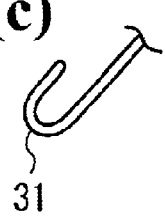
Figure 11D:
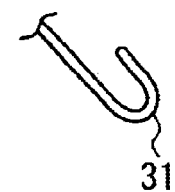
Figure 12A:
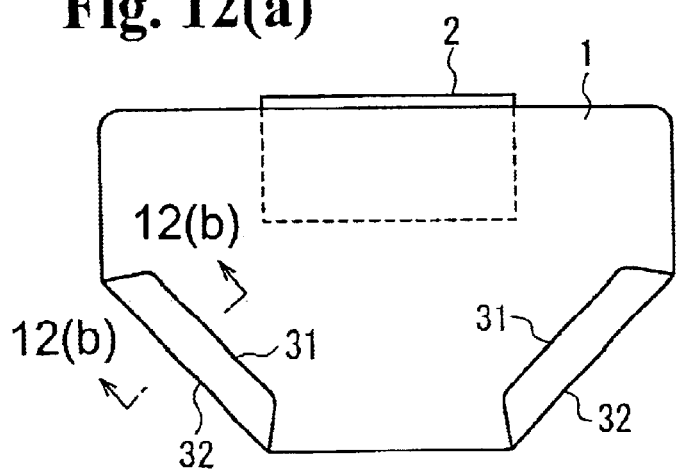
FIGS. 12(a) and 12(b) are views showing a process of folding the airbag according to the further embodiment.
Figure 12B:
Figure 13A:
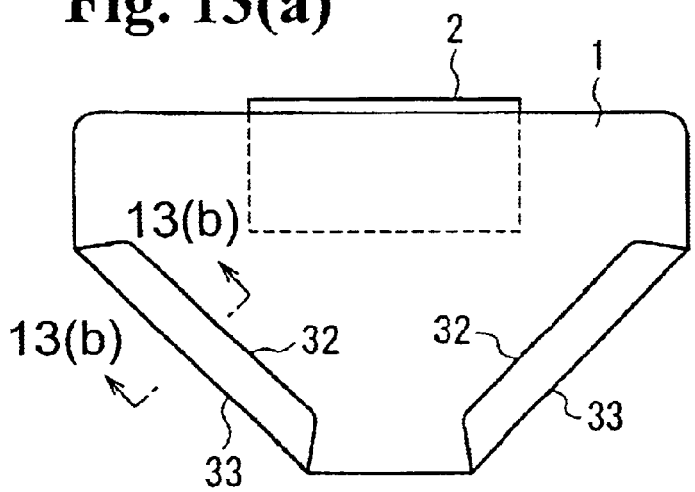
FIGS. 13(a) to 13(f) are views showing a process of folding the airbag according to the further embodiment.
Figure 13B:
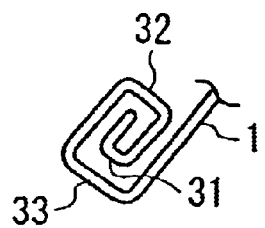
Figure 13C:
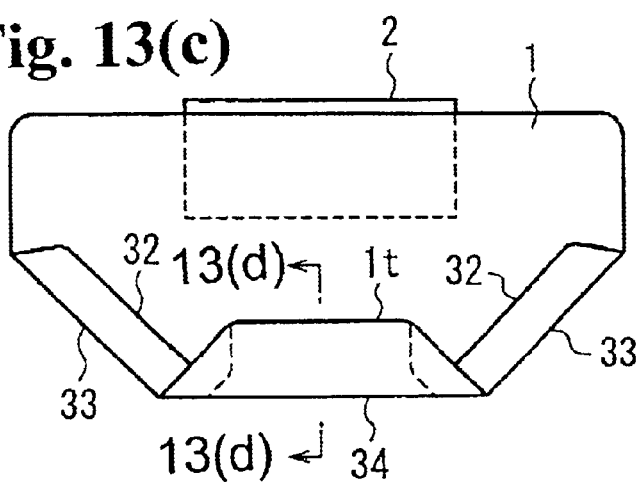
Figure 13D:
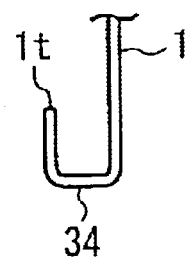
Figure 13E:
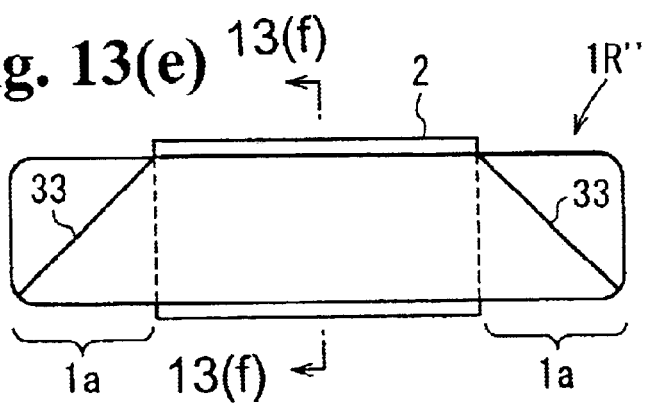
Figure 13F:
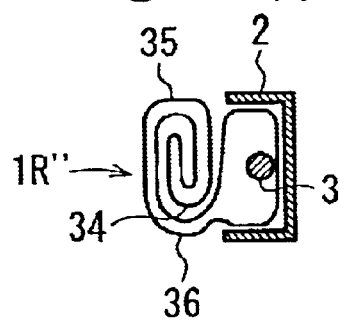

With reference to FIGS. 11(a)–11(d) to FIGS. 13(a)–13(f), another folding process will be described. FIGS. 11(b), 11(c) and 11(d) are cross sectional views taken along lines 11(b)—11(b), 11(c)—11(c) and 11(d)—11(d) in FIG. 11(a), respectively. FIG. 12(b) is a cross sectional view taken along line 12(b)—12(b) in FIG. 12(a). FIGS. 13(b), 13(d) and 13(f) are cross sectional views taken along lines 13(b)—13(b), 13(d)—13(d) and 13(f)—13(f) in FIGS. 13(a), 13(c) and 13(e), respectively.

At first, the airbag 1 is folded as a whole along a lateral folding line 30 so that the airbag 1 is placed under the case 2 as shown in FIGS. 11(a) and 11(b). The state before folding along folding lines 31 (described later) is the same as that shown in FIGS. 7(c) and 7(d).

Form the state shown in FIGS. 7(c) and 7(d), the airbag 1 is folded toward the passenger along oblique folding lines 31 at corners near both ends of the edge 1t of the airbag. The folding line 31 intersects both the edge 1t and side edge of the airbag, which meet at the corner thereof.

As shown in FIGS. 12(a) and 12(b) and FIGS. 13(a) and 13(b), the airbag 1 is further folded twice toward the passenger along the second folding lines 32 and 33 parallel to the folding lines 31.

Next, as shown in FIGS. 13(c) and 13(d), a lower portion of the airbag 1 is folded along a lateral folding line 34 so that the edge 1t is placed on the passenger side. Then, as shown in FIGS. 13(e) and 13(f), the airbag 1 is folded along lateral folding lines 35 and 36 to form a main wound body 1R". The wound body 1R" is wound clockwise toward the edge 1t as shown in FIG. 13(f).

As shown in FIG. 13(e), the wound body 1R" has left and right overhanging portions 1a. Although not shown, these overhanging portions 1a are wound as in FIG. 5 to form the side wound bodies, and then stored in the case 2. Subsequently, the lid is attached to complete the passenger leg protection apparatus.

According to this type of leg protection apparatus, the same effects as in the aforementioned passenger leg protection apparatus are achieved. In the embodiment shown in FIGS. 11(a)–11(d) to FIGS. 13(a)–13(f), there are portions folded along the oblique folding lines 31, 32 and 33. Thus, the left and right corner portions of the airbag 1 are inflated later, and as a consequence, the airbag 1 is deployed sooner in the lateral directions and upward direction.

Further, another airbag folding process will be described with reference to FIGS. 14(a)–14(e). FIG. 14(b) is a cross sectional view taken along line 14(b)—14(b) in FIG. 14(a). FIGS. 14(d) and 14(e) are cross sectional views taken along line 14(d)—14(d), 14(e)—14(e) in FIG. 14(c), respectively.

In the process shown in FIGS. 14(a)–14(e), the airbag 1 is placed in the initial state as shown in FIGS. 1(a) and 1(b), and then the upper portion of the airbag 1 is folded into bellows along lateral folding lines 41, 42 and 43. Subsequently, as indicated by an arrow A in FIG. 14(b), the portion in the form of bellows is folded along a lateral folding line 44 so as to roll up inwardly. As shown in FIG. 14(d), a main wound body rolled clockwise from the lateral folding line 43 to the lateral folding line 44 is formed. The left and right overhanging portions 1a of the wound body are wound to form side wound bodies, and stored inside the case 2. Subsequently, the lid is attached to complete the passenger leg protection apparatus.

This type of passenger leg protection apparatus has the same effects as the preceding embodiments. Especially, in this type of passenger leg protection apparatus, in the last stage of inflation, the portion in the form of bellows is inflated so as to extend upward. The portion of bellows expands in an area above patellae, thereby preventing the bellows from rubbing the legs of the passenger.

As shown in FIG. 15, a portion near the edge it of the concertinas portion shown in FIG. 14(b) may further be folded along the lateral folding line 40.

With reference to FIGS. 16(a)–16(d) and FIGS. 17(a)–17(d), further different embodiment will be described. FIGS. 16(c) and 16(d) are cross sectional views taken along lines 16(c)—16(c) and 16(d)—16(d) in FIGS. 16(b) and 16(d), respectively.

Figure 17A:
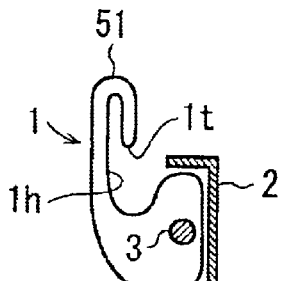
FIGS. 17(a) to 17(d) are views showing a process of folding the airbag according to the still further embodiment.
Figure 17B:
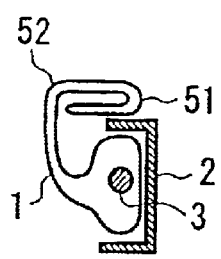
Figure 17C:
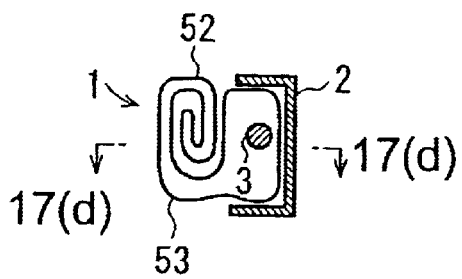
Figure 17D:
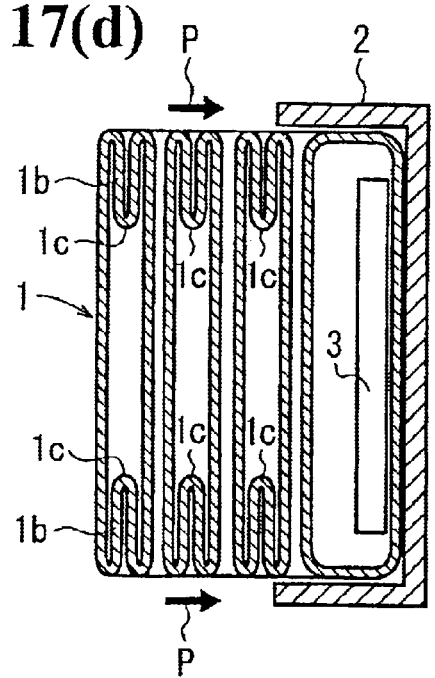

In this embodiment, the airbag 1 is folded from an initial state in FIG. 16(a) (same as in FIG. 1(a) described above) in such a manner that both side portions 1b along both sides 1c of the airbag 1 are pushed into the airbag 1 along vertical folding lines 50, as shown in FIGS. 16(b) and 16(d). Subsequently, similar to the process shown in FIGS. 2(a), 2(b), 3(a), 3(b) and 4(a), 4(b), the airbag is folded along the lateral folding lines 51, 52 and 53 to form a wound body as shown in FIGS. 17(a), 17(b) and 17(c). Then, as shown in FIG. 17(d), the folded body is stored into the case 2 as indicated by an arrow P, and a lid is attached thereon to complete the passenger leg protection apparatus.

According to this embodiment, when the passenger leg protection apparatus is inflated, the airbag 1 comes out from the case 2, and then the wound body is inflated as rolling upward along the legs of the passenger. Subsequently, the side portions 1c are inflated laterally. In this manner, the airbag 1 is inflated upward in an early state. Thus, this embodiment is preferable for a small vehicle in which only a small space is available around the patellae of the passenger.

Figure 18A:
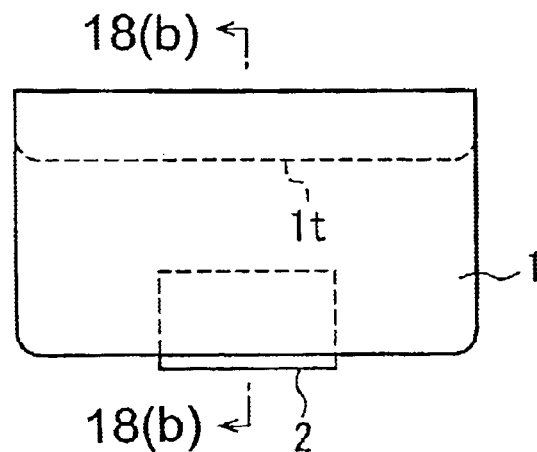
FIGS. 18(a) to 18(d) are views showing a process of folding the airbag according to a still further embodiment.
Figure 18B:
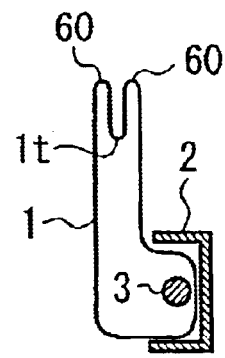
Figure 18C:
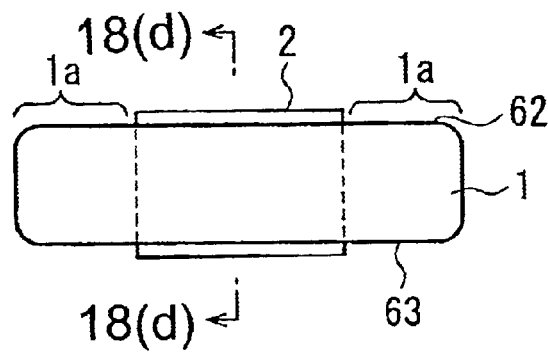
Figure 18D:
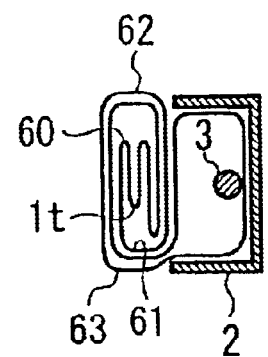

As shown in FIGS. 18(a) and 18(b), the airbag 1 may be folded from the initial state shown in FIG. 1(a) in such a manner that the upper edge it is pushed into the airbag 1 along lateral folding lines 60, and then folded similar to any one of the folding processes described above. In FIGS. 18(c) and 18(d), after FIGS. 18(a) and 18(b), the airbag 1 is folded along lateral folding lines 61, 62 and 63 to form a main wound body according to the processes shown in FIGS. 2(a), 2(b) to FIGS. 4(a), 4(b). Subsequently, the overhanging portions 1a are wound to form the side wound bodies, and stored inside the case 2 to complete the passenger leg protection apparatus.

Note that FIG. 18(b) is a cross sectional view taken along line 18(b)—18(b) in FIG. 18(a), and FIG. 18(d) is a cross sectional view taken along line 18(d)—18(d) in FIG. 18(c).

Figure 19:
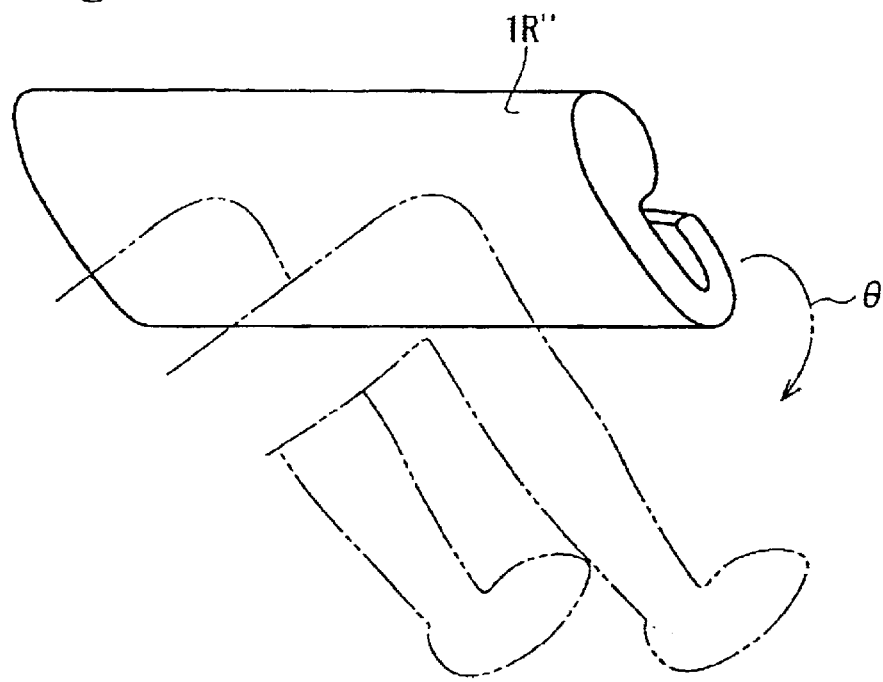
FIG. 19 is a view showing a state of inflation of the airbag according to the embodiment.

In the present embodiment, the main wound body is inflated as rolling upward from the bottom. However, according to the present invention, the main wound body may be folded so that the airbag is inflated as rolling downward from the top along the front surface of the legs of the passenger as shown in FIG. 19. In this case, the airbag is to be folded symmetrically to the preceding embodiments in the vertical direction.

As described above, the passenger leg protection apparatus of the invention is inflated smoothly without being blocked by the legs of the passenger.

While the invention has been explained with reference to the specific embodiments of the invention, the explanation is illustrative and the invention is limited only by the appended claims.

What is claimed is:

1. A passenger leg protection apparatus for protecting legs of a passenger in a vehicle, comprising:
   a case to be attached to the vehicle,
   a gas generating unit disposed in the case for generating a gas, and
   an airbag disposed in the case in a folded state and connected to the gas generating unit to be inflated by the gas generated from the gas generating unit and deployed from the case, said airbag having a folded portion folded along lateral folding lines continuously in a plurality of times in a same direction so that the folded portion is deployed vertically while rolling when the airbag is inflated, and at least one side body, said airbag being folded along the lateral folding lines and then the at least one side body being folded along vertical folding lines.

2. A passenger leg protection apparatus according to claim 1, wherein said airbag includes, in an unfolded flat form, a first side portion connected to the case, a second side portion located at a side away from the first side portion, and left and right portions relative to the case, said second side portion having a second folded portion including said folded portion, said second folded portion extending to the left and right portions and disposed above the case by folding along the lateral folding lines, said left and right portions having left and right folded portions located above the case by folding parts of the second folded portion along vertical folding lines without overlapping each other.

3. A passenger leg protection apparatus according to claim 2, wherein said second folded portion has an inwardly rolled portion, and each of said left and right folded portions has an inwardly rolled portion.

4. A passenger leg protection apparatus according to claim 3, wherein said second folded portion includes portions folded in bellows.

5. A passenger leg protection apparatus for protecting legs of a passenger in a vehicle, comprising:

a case to be attached to the vehicle, a gas generating unit disposed in the case for generating a gas, and an airbag disposed in the case in a folded state and connected to the gas generating unit to be inflated by the gas generated from the gas generating unit and deployed from the case, said airbag having a folded portion folded along lateral folding lines continuously in a plurality of times in a same direction so that the folded portion is deployed vertically while rolling when the airbag is inflated, wherein said airbag includes, in an unfolded flat form, a first side portion connected to the case, a second side portion located at a side away from the first side portion, and left and right portions relative to the case, said second side portion having a second folded portion including said folded portion, said second folded portion extending to the left and right portions and disposed above the case by folding along the lateral folding lines, said left and right portions having left and right folded portions located above the case by folding parts of the second folded portion along vertical folding lines without overlapping each other, said second folded portion having an inwardly rolled portion, each of said left and right folded portions having an inwardly rolled and obliquely folded portion folded obliquely from an edge away from the first side portion, said second folded portion having said obliquely folded portions.

* * * * *